Jan. 16, 1968

R. M. J. PLACE 3,363,339

BRAILLE CELL STRUCTURE

Filed Oct. 11, 1965

INVENTOR

RUTH M. J. PLACE

BY
ATTORNEYS

United States Patent Office 3,363,339
Patented Jan. 16, 1968

3,363,339
BRAILLE CELL STRUCTURE
Ruth M. J. Place, 1139 N. Jenison,
Lansing, Mich. 48915
Filed Oct. 11, 1965, Ser. No. 494,345
19 Claims. (Cl. 35—38)

ABSTRACT OF THE DISCLOSURE

A braille cell structure in which the traditional 6 element matrix of dots or raised embossments is varied to include variously configured embossments, a particular geometry, orientation, and other tactually perceptible feature being associated with each cell element or position. A specific brailling machine with specifically shaped styli to accomplish these special embossments, is described. Finally the method of creating such braille cells having increased readability, is disclosed.

This invention relates to a new braille cell structure, and a new apparatus and process for making the same. More particularly the invention relates to a new braille cell which can be read with greater speed, ease, and accuracy than was possible in prior art braille cells, and a new method and aparatus for making the new braille cells.

Braille is a system of coded characters, called "cells," which correspond to the commonly used alphabetic characters and numbers, but which can be perceived or "read" by blind persons through manual touch. In braille, as presently used, an ordinary alphabetic or numeric character is represented by some combination of the six elements of a 3 by 2 matrix, or braille cell. At each of these elemental positions the heavy braille paper stock may or may not be impressed with a small embossment, or raised dot, which herein will also be referred to as a "boss." Each matrix or cell of six elements therefore can be arranged into $2^6=64$ different combinations of dots or bosses. This is more than enough to represent 27 alphabetic characters, with sufficient combinations left over for the numerals 0–9, and additional special characters, e.g., punctuation marks and the like. The example of FIGURE 5 shows the particular dot combinations used in braille to represent the letter "Y."

In braille copy the cells are larger than the size of most ordinary print. Moreover the stock on which the cells are impressed is expensive because it must be thick and of sufficient quality to retain the impression without yielding to light pressures. As a consequence of the expense of the braille material the cells are imprinted quite close to one another to economize on the paper. The closeness of characters often causes confusion for the blind reader, especially the less skilled reader or inexperienced learner. The reason is that the reader cannot distinguish one cell from another due to their proximity. He may confuse the second column of one cell with the first column of the next following cell. Or he may confuse a row of one cell with a row of a different cell on an adjacent line of braille print, above or below. Such confusion is annoying and inconvenient since it slows the reading process and breaks the continuity of thought on the material read. Moreover, once confusion occurs it is disturbing, time consuming and difficult to reorient the reading fingertips to the correct position.

It is a further problem that disorientation can occur within the braille cell itself. If a row or column of the cell matrix is blank, then there is no way for the reader to ascertain the identiy of the non-blank rows or columns. Thus, if a cell column is blank, the blind reader cannot know whether the bosses he perceives are in the first column or the second column of the cell matrix. Similarly, if a cell row is blank, it cannot be easily determined as to which rows the existing bosses belong. If both a row and column are blank, it is nearly impossible, except through instinct and experience, to determine a reference point and identify the row or column in which a boss is located.

My invention eliminates this very perturbing and disagreeable feature of present braille by using non-uniform raised dots or embossments, in regular braille locations which enable the reader to identify the cell line or column to which a boss belongs, even when a row or column is blank.

An additional problem arises for braille readers whose blindness is associated with brain injury. These readers tend to confuse left with right, and vice versa, and consequently will often mentally reflect a braille cell into a reverse, or mirror, image, through an unconscious mental process which transposes the column locations of all the bosses in a cell pattern. This image of course would represent a different character than that given by the actual cell configuration. A significant factor leading to these braille reversals is the use of identical dots in each position of the cell pattern. My invention greatly reduces the likelihood of such errors by associating a peculiar indicium with each cell position, instead of the present raised dot or boss which has no inherent identification of the cell position with which it is associated.

Accordingly it is an object of my invention to provide a new structure of braille cell embossments which enables blind readers of braille to avoid becoming disoriented among a confusing array of dots on a braille page.

It is also an object of my invention to teach a method of making braille cells which will allow a user thereof to remain oriented and unconfused between lines of braille print, between braille cells, or between lines or columns within the braille cell itself.

It is still another object of my invention to provide a braille cell structure in which left hand and right hand bosses are distinguished, to minimize the likelihood of braille reversals by brain injured readers.

It is another object of my invention to reveal an apparatus for making braille cells of the kind used to accomplish the above stated objectives.

It is a further object of my invention to provide a new and simple method and apparatus for making braille cells which will greatly improve the speed, ease and accuracy with which blind persons will be able to perceive and comprehend braille copy.

In the drawings:
FIGURE 1 is a plan view of a braille cell showing one embodiment of my invention, with a raised boss arrangement wherein each boss has a particular shape peculiar to the cell position of the boss.

Specification

Figure 5:
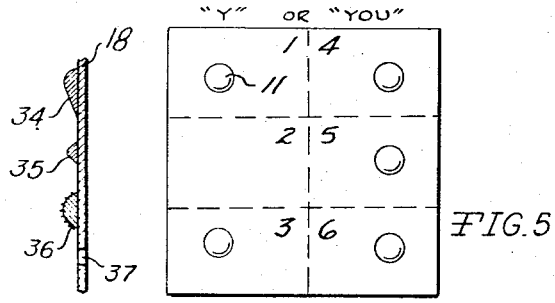
FIGURE 5 is a plan view of a prior art braille cell containing the representation of the letter "Y"(which, when standing alone without adjacent letters, is the representation for the word "you").
Figure 8:
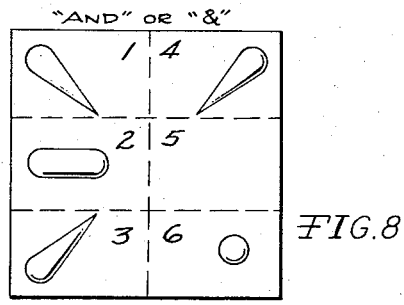
FIGURE 8 is a plan view of the new braille cell of the present invention showing the representation of the word "and" (compare with prior art braille of FIGURE 6).

In my invention I have provided a braille cell boss structure which departs substantially from the previously used technique of employing six dots, all identical as to shape, height, and orientation. This old arrangement is best exemplified in FIGURE 5 which shows the ordinary braille dot arrangement for the letter "Y." The heights, shapes and sizes of all these braille dots or bosses are equal. Considered alone each of the dots 11 are identical.

Figure 1:
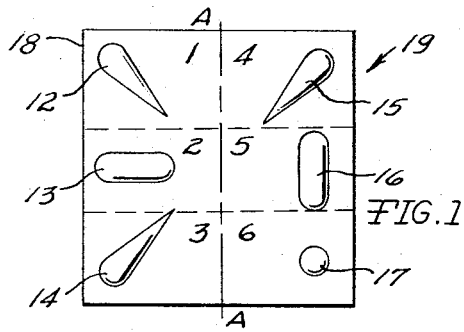

By reference to FIGURE 1 arrangement of non-uniform indicia 12–17 inclusive is shown wherein a tactually distinct indicium is assigned to each of the six indicated cell positions. Each cell position is numbered and its location in the total cell is delineated by phantom lines. For example the indicium 12 in position 1 has a tear drop shape oriented at a 45 degree angle to the left of vertical. The indicium 13 in position 2 has an elongate rod-like form oriented horizontally.

In like manner the indicia 14, 15, 16 and 17 are each unique with respect to tactual perception. As will be appreciated bosses are shown being raised above the surface of the paper or card stock 18 in the FIGURE 1.

The outcome of these variations is that each of the six cell positions has a distinct tactual character, distinguishable from all the other cell positions. This is exemplified in the FIGURES 1 and 2 by differences in shape and/or orientation and/or height. In other words a blind reader can now ascertain, by feeling any single indicium the exact matrix position of that indicium in the cell 19. Thus, each cell position, if embossed as shown for example, contains an identifying indicium within the cell position. It is not necessary to refer tactually to other cell positions in order to determine the identity of any cell position. The location number of any embossed cell position can now be identified solely by touching that single cell position, since it presents a unique tactual experience for the reader only associatable with that cell position. It should be appreciated that various features could be used to identify cell positions. The cell positions could be differentiated by the shape of the boss alone (or even size alone). Boss height, or orientation of a boss could be the sole identifying factors.

Figure 10:
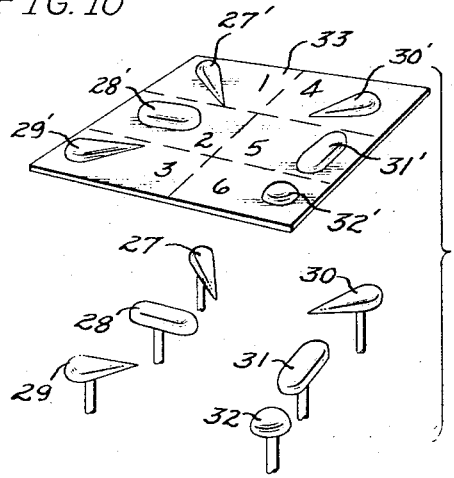
FIGURE 10 is a somewhat schematic view, similar to FIGURES 3 and 4, but showing cell bosses as detachable elements.

It is not even necessary that bosses be used. This invention contemplates the use of other tactually appreciable indicia of each cell position. For example, small appendages magnetically or otherwise attached to any of the six cell locations, could be arranged as seen in FIGURE 10 in varying matrix combinations as detachable elements 34, 35 and 36, to represent a variation of characters. Each of these appendages could be tactually identifiable, as by its shape, height, smoothness of surface, or some other physical feature. The concept is thus extendable to include openings 37 through the base stock 18.

Still another alternative would be to employ some composite scheme using more than one of the above mentioned identifying features in combination.

Figure 2:
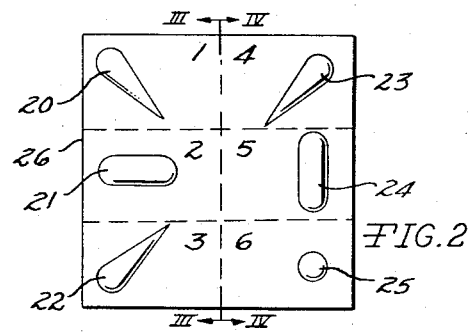
FIGURE 2 is a plan view of the preferred embodiment of my invention, wherein the shapes of the respective bosses are identical to those shown in FIGURE 1, but wherein the heights of the bosses are varied according to cell position.
Figure 7:
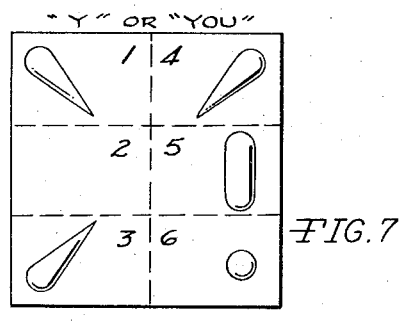
FIGURE 7 is a plan view of the braille cell of the present invention showing the representation of the letter "Y" (compare with prior art braille in FIGURE 5).
Figures 3, 4, 9:
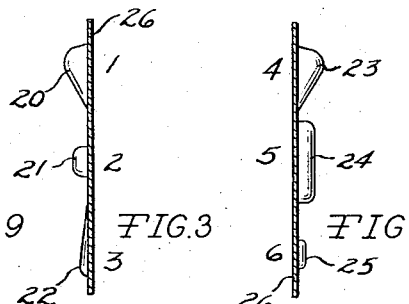
FIGURE 3 is a cross section elevation view of the structure in FIGURE 2, taken on line III—III and showing the variations of boss heights associated with cell positions 1–3.
FIGURE 4 is a cross section elevation view of the structure in FIGURE 2, taken in line IV—IV and showing the variations of boss heights associated with cell positions 4–6.
FIGURE 9 is a perspective view of apparatus of the present invention for producing the new braille cells of the present invention, showing stylus heads or male braille dies and the corresponding female braille dies for producing the newly configured braille cells of the present invention as shown in FIGURE 2.

My preferred embodiment, shown in FIGURES 2, 3 and 4, employs bosses 20–25 inclusive as cell position indicia on the stock 26. The distinctive feature of each cell position is a particular shape, height, and orientation of the boss. This combination of characteristics merely serves to augment the degree of distinction and greatly increases the ease and speed with which a reader may identify the row or column of a particular boss. Other tactually perceivable boss distinctions in structure might very well be devised, and are within the scope of this invention. For example soft or hard bosses, sharp or dull, rough or smooth, or even, conceivably, heat and cold, could be utilized as distinguishing features for tactually differentiating one cell position from another.

My preferred embodiment uses only three boss heights, a different height being associated with each row of the cell, as seen in FIGURES 3 and 4. A separate height is assigned to boss 20, boss 21, and boss 22. This step wise variance is also seen between boss 23, boss 24 and boss 25. Each row of bosses, for example 20 and 23, may have equal height, thus only three separate boss heights are present. It is thought that more than three distinct heights is unnecessary, and perhaps increases rather than lessens confusion, especially for a beginner.

The plan form is seen in FIGURE 2. Bosses 20 and 23 in cell positions 1 and 4 have tear drop shapes, at opposite 45 degree angles away from the vertical. Bosses 21 and 24 in cell positions 2 and 5 are substantially rod shaped, one boss 24 being vertical and the other boss 21 horizontal. The boss 22 in cell position 3 is an inverted tear drop shape pointing inward at 45 degrees to vertical. The boss 25 in cell position 6 is a circular boss similar to the raised dots found in prior braille cells. Other distinct arrangements may be used but the arrangement shown is most satisfactory in teaching experiences to date.

FIGURE 3 is a section elevation view, taken on line III—III of FIGURE 2, showing the boss elevations of cell positions 1–3 progressing from highest on the top row of the cell to lowest on the bottom row of the cell.

FIGURE 4 is a section elevation view at IV—IV of FIGURE 2 showing an identical progression of boss elevations in cell positions 4–6. It is seen that the elevations of the two bosses 20 and 23, 21 and 24, and 22 and 25 in any row are equal. Thus cell positions 1 and 4 have the same height, as do positions 2 and 5, and 3 and 6.

It should be pointed out that these means of boss differentiation serve not only to identify any cell position in a single braille cell, but also to prevent confusion of a boss of one braille cell with the boss of another. Thus not only can the blind reader quickly fix the location of a boss as on a specific row or column of a cell, but he can easily distinguish and ignore the dots or bosses of a cell on an adjacent line of braille print, or of an adjacent braille cell on the same line of braille print. These kinds of errors are as common and troublesome as that of confusion within a braille cell, especially when the cells and lines of print are very closely spaced, which is often the case, since it is desirable to conserve the expensive braille paper stock.

Another common difficulty is the problem of braille reversals where cell patterns of bosses are mentally turned around into a reverse, or mirror, image. This braille reversal problem is especially troublesome to brain-injured readers, which group comprises as much as 50 percent or more of all blind children.

Figure 6:
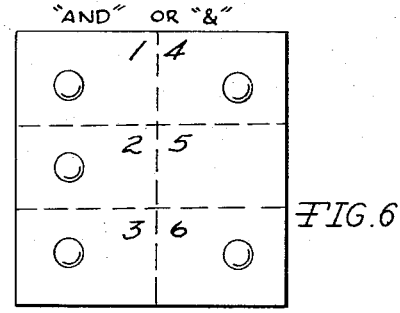
FIGURE 6 is a plan view of a prior art braille cell containing the representation of the ampersand or the word "and," which have equivalent meanings.

The phenomenon of braille reversal occurs when the mental faculty fails to correctly register what is tactually perceived at the fingertip. In the reversal process the cell pattern undergoes a mental transformation which puts each boss into the column opposite the one in which it actually appears. The row, or vertical location of the boss remains unchanged. The reultant cell pattern is a mirror reflection of the original pattern about a vertical axis, the center-line A—A of FIGURE 1. Accordingly a cell pattern with a boss in cell positions 1, 2, and 3 could be transformed or reversed into a mental pattern having bosses in cell positions 4, 5 and 6. Similarly, the cell pattern for the character "Y" shown in FIGURE 5 would reverse to the cell pattern for "AND" shown in FIGURE 6. Other examples where reversal transforms one character pattern into the pattern for some other character are the character pairs "F" and "D," "H" and "J," and "E" and "I."

It is estimated that as much as 50% of all blind children are brain-injured. These children are particularly susceptible to the problem of braille reversal and have great need for a braille cell which will suppress the tendency to reverse the cell patterns.

My invention greatly reduces the frequency of braille reversal because in my cells no cell pattern exists which is the reversed image of any other cell pattern. This is best appreciated by reference to FIGURE 2 in which it is seen that there is no symmetry about any axis in the complete cell pattern. Because no cell pattern is the reverse of any other, mental confusion or reversal is very greatly inhibited.

All of these described errors are especially troublesome for beginners, and therefore my invention serves greatly to facilitate the speed, ease and accuracy of braille reading, epecially for students, beginners and brain damaged blind children. This is accomplished in the manner already described, first by substantially reducing the likelihood of reader confusion between bosses within a braille cell; second, by substantially reducing the chance of confusion between adjacent braille characters on a line; and third, by reducing the likelihood of confusion between adjacent lines of braille print. A fourth important feature of the present invention is that the frequency of braille reversals is significantly decreased.

It should be noted that my new characters within the braille cell are easily readable by one already trained to read the old cell. No new training is necessary and the transition to the new cell is made quickly and easily, since the same cell patterns represent the same characters as in the old system.

In FIGURE 9 is seen a brailling machine stylus head structure for producing the new type cell bosses already described. These stylus heads are seen to have a geometrical form corresponding to the geometrical features of the bosses in the preferred embodiment of my braille cell structure. In its broadest sense the apparatus is any structure for practicing the method of applying a tactually perceptible, distinct indicium to each cell position. The preferred embodiment of FIGURE 9 teaches an apparatus for impressing or forming a boss onto heavy braille stock and applying to that boss a tactually perceptible physical feature, namely a particular tactually distinguishable boss geometry. The male boss forming elements 27–32 inclusive are actually male embossing dies, and controllably close upon paper stock (not shown) backed by the female die 33 having pockets 27'–32' in register with the male dies in any combination desired, as for example found on common braille instruments.

This structure allows the preferred embodiment of my braille cell to be produced by presently used brailling machines. Such machines would only need to be implemented with stylus heads and dies of this invention. Operation of the machine would be unchanged from the operation of present machines. Thus no problems are presented to a brailling machine user in changing to the new braille structure.

Having thus described my invention and the preferred embodiments thereof it will be understood that various obvious improvements, changes, modifications, and alterations may be made by those skilled in the art without departure from the intended spirit of the invention which is limited only by the scope of the hereinafter appended claims.

I claim:

1. In a system of tactually interpretable cells for blind readers, of the type in which a specific combination of cell positions indicates a specific print character, and in which a specific combination of cell positions is indicated by the presence of a tactually perceptible indicium at each cell position in the combination, the improved system comprising a collection of such cells in which the indicium associated with any specific cell position is identical on all cells, but physically different and tactually distinguishable from the indicium appearing at any other cell position in said collection of cells.

2. In a braille cell of the type employing a six element matrix of cell positions wherein any of the cell positions are provided with a tactually perceptible indicium, the cell structure comprising: a tactually perceptible indicium located at any of said cell positions, said indicium being systematically associated with that cell position and physically different from indicium associated with others of said cell positions, so as to provide tactually perceptible identification of the cell position and differentiation thereof from others of said cell positions.

3. In a braille cell of the type employing a 3 by 2, six element matrix of cell positions: a boss in any of the cell positions, said boss having a tactually perceptible physical feature associated with that cell position and physically different from indicium associated with others of said cell positions, whereby that cell position may be tactually identified and distinguished from others of said cell positions.

4. The structure of claim 3 in which the tactually distinguishable physical feature of the boss is the geometrical form of the boss.

5. The structure of claim 4, wherein the tactually distinguishable boss feature is in the height of the boss.

6. The structure of claim 4 wherein the tactually distinguishable boss feature is the shape of the boss.

7. The structure of claim 4 wherein the tactually distinguishable boss feature is the orientation of the boss.

8. In a braille cell of the type employing a 3 by 2, six element matrix of cell positions for matrix combinations of raised bosses, the six cell positions being designated by the numbers 1–6, counting from 1–3 downward in the left column, and then 4–6 downward in the right column, any matrix combination of the tactually distinguishable cell position identifying indicia comprising:

(a) a boss in cell position 1, said boss being substantially tear drop shaped, and in an orientation determined by rotating said tear drop from a downward pointed position, about the point of said tear drop, substantially 45 degrees counter-clockwise;

(b) a boss in cell position 2, said boss being substantially rod shaped and horizontally oriented, the elevation of said boss differing, to a tactually perceptible degree, from that of the boss associated with cell position 1;

(c) a boss in cell position 3, said boss being substantially tear drop shaped, and in an orientation determined by pointing the tear drop upward and then rotating said tear drop, about the point thereof, substantially 45 degrees clockwise, the elevation of said boss differing, to a tactually perceptible degree, from those of the bosses associated with cell positions 1 and 2;

(d) a boss in cell position 4, said boss being substantially tear drop shaped and in an orientation determined by pointing the tear drop downward and then rotating said tear drop, about the point thereof, substantially 45 degrees clockwise, the elevation of said boss being equal to the elevation of the boss associated with cell position 1;

(e) a vertical, substantially rod shaped boss in cell position 5, the elevation of said boss being equal to the elevation of the boss associated with cell position 2; and (f) a circular shaped boss in cell position 6, the elevation of said boss being equal to that of the boss associated with cell position 3; whereby the identity of any cell position may be determined by tactual reference to the boss of that cell position solely.

9. In a method of making a braille cell as a 3 by 2 six element matrix of cell positions the step comprising: applying to any of said cell positions a tactually perceptible, distinct indicium associated with that cell position and, physically different from indicium associated with others of said cell positions, whereby that cell position may be identified by tactual reference solely to the indicium applied thereat.

10. In a method of making a braille cell as a 3 by 2 six element matrix of cell positions, the steps comprising:
  (a) impressing, in any cell position, a raised boss physically different from the boss impressed in any others of said cell positions; and
  (b) applying to said boss a tactually perceptible physical feature associated with said cell position, whereby that cell position may be identified by tactual reference solely to the boss of that cell position.

11. The method of claim 10 wherein the physical feature applied to the boss is a tactually distinguishable geometrical feature of the boss.

12. The method of claim 11 wherein the tactually distinguishable geometrical feature is a specific boss height.

13. The method of claim 11 wherein the tactually distinguishable geometrical feature is a specific boss shape.

14. The method of claim 11 wherein the tactually distinguishable geometrical feature is a specific boss orientation.

15. In the method of making braille cells as a 3 by 2 six element matrix of cell positions of raised bosses, the six cell positions being numbered 1–6, counting 1–3 downward in the left column, and 4–6 downward in the right column, any combination of the following steps of making a cell position tactually identifiable without reference to others of the cell positions, comprising:
  (a) forming a boss in cell position 1 in a substantially tear drop shape, and in an orientation determined by rotating said tear drop from a downward pointed position, about the point of said tear drop substantially 45 degrees counter-clockwise;
  (b) forming a boss in cell position 2 substantially rod shaped and horizontally oriented, the elevation of said boss differing, to a perceptible degree from the boss elevation associated with cell position 1;
  (c) forming a boss in cell position 3 substantially tear drop shaped, and in an orientation resulting from pointing the tear drop upward and then rotating said tear drop, about the point thereof, substantially 45 degrees clockwise, the elevation of said boss differing to a tactually perceptible degree, from those of the bosses associated with cell positions 1 and 2;
  (d) forming a boss in cell position 4 in a substantially tear drop shape and in an orientation resulting from pointing the tear drop downward and then rotating said tear drop, about the point thereof, substantially 45 degrees clockwise, the elevation of said boss equal to the boss elevation associated with cell position 1;
  (e) forming a boss in cell position 5 substantially rod shaped and in a vertical orientation, the elevation of said boss being equal to the boss elevation associated with cell position 2; and
  (f) forming a boss in cell position 6 in a circular shape, the elevation of said boss being equal to the boss elevation associated with cell position 3.

16. In a brailling machine having six manually controlled stylus heads, for impressing a raised boss onto any one of six positions of a 3 by 2 six element braille cell, wherein the shape of the boss impressed corresponds to the shape of the stylus head which impresses the boss, the structure comprising: a stylus head formed with a distinct geometry, associated with its corresponding cell position said geometry differing from that of others of said stylus heads, whereby the cell position of a boss impressed by that stylus head is identifiable by tactual reference solely to that cell position.

17. The apparatus of claim 16 wherein the distinct geometry of the stylus head is the vertical heighth thereof.

18. The apparatus of claim 16 wherein the distinct geometry of the stylus head is the horizontal cross-sectional shape thereof.

19. The apparatus of claim 16 wherein the distinct geometry of the stylus head is the rotational attitude thereof about a vertical axis.

References Cited

UNITED STATES PATENTS 506,718  10/1893  Orndoff _____ 35—38 X

FOREIGN PATENTS 977,209  11/1950  France.
 62,427   1/1955  France.

EUGENE R. CAPOZIO, *Primary Examiner.*

W. GRIEB, *Examiner.*